(12) United States Patent
Navale et al.

(10) Patent No.: US 10,605,496 B2
(45) Date of Patent: Mar. 31, 2020

(54) AIR CHANGEOVER SYSTEM FOR METAL HYDRIDE HEAT PUMP

(71) Applicant: THERMAX LIMITED, Pune (IN)

(72) Inventors: Devadatta Pundlik Navale, Pune (IN); Vilasrao Vyankatrao Dubal, Pune (IN); Anil Patki, Pune (IN); Ramakrishna Ramanath Sonde, Pune (IN)

(73) Assignee: THERMAX LIMITED, Pune (IN)

( * ) Notice: Subject to any disclaimer, the term of this patent is extended or adjusted under 35 U.S.C. 154(b) by 142 days.

(21) Appl. No.: 15/551,139

(22) PCT Filed: Nov. 26, 2015

(86) PCT No.: PCT/IB2015/059145
§ 371 (c)(1),
(2) Date: Aug. 15, 2017

(87) PCT Pub. No.: WO2016/132191
PCT Pub. Date: Aug. 25, 2016

(65) Prior Publication Data
US 2018/0031284 A1    Feb. 1, 2018

(30) Foreign Application Priority Data
Feb. 16, 2015    (IN) ............................ 488/MUM/2015

(51) Int. Cl.
*F25B 17/12*    (2006.01)
*B60H 1/32*    (2006.01)
(Continued)

(52) U.S. Cl.
CPC .......... *F25B 17/12* (2013.01); *B01D 53/0438* (2013.01); *B01D 53/0462* (2013.01);
(Continued)

(58) Field of Classification Search
CPC .................. F25B 17/12; B60H 1/3201; F24F 2003/1464; F24F 2006/065;
(Continued)

(56) References Cited

U.S. PATENT DOCUMENTS

| 5,408,847 A * | 4/1995 | Erickson ............... F25B 17/086 62/478 |
| 6,722,154 B1 | 4/2004 | Tan et al. |

(Continued)

FOREIGN PATENT DOCUMENTS

JP    2012-083060 A    4/2012

*Primary Examiner* — Cassey D Bauer
(74) *Attorney, Agent, or Firm* — Cowan, Liebowitz & Latman, P.C.

(57) ABSTRACT

An air changeover system for a metal hydride heat pump is disclosed. The system includes metal hydride reactor modules aligned and separated by a partition; a shell containing the reactor modules, the shell is compartmentalized to define separate insulated chambers for each of the reactor modules; and a bearing assembly supporting the modules at a location about the partition, wherein the bearing assembly rotates said modules about an axis during the absorption and the desorption mode. The system reduces thermal inertia and pressure drop in the heat transfer medium while flowing through the heat pump, to enhance the performance and conserve energy.

13 Claims, 9 Drawing Sheets

(51) Int. Cl.
*B01D 53/04* (2006.01)
*B01D 53/047* (2006.01)
*C01B 3/00* (2006.01)
*F17C 11/00* (2006.01)
*B60H 1/00* (2006.01)

(52) U.S. Cl.
CPC ....... *B01D 53/0473* (2013.01); *B60H 1/3201* (2013.01); *C01B 3/0005* (2013.01); *F17C 11/005* (2013.01); *B01D 2253/1126* (2013.01); *B60H 1/00028* (2013.01); *B60H 1/00057* (2013.01); *B60H 1/00842* (2013.01); *B60H 1/00899* (2013.01); *Y02A 30/277* (2018.01); *Y02B 30/62* (2013.01); *Y02E 60/324* (2013.01)

(58) Field of Classification Search
CPC ............ B01D 53/0438; B01D 53/0462; B01D 53/0473; Y02B 30/62
See application file for complete search history.

(56) References Cited

U.S. PATENT DOCUMENTS

2005/0274138 A1   12/2005   Golben
2005/0274493 A1*  12/2005   Golben ................... B60H 1/32
                                                     165/104.12

\* cited by examiner

AIR CHANGEOVER SYSTEM FOR METAL HYDRIDE HEAT PUMP

FIELD OF THE DISCLOSURE

The present disclosure relates to a metal hydride heat pump.

More particularly, the present disclosure relates to an air changeover system for metal hydride heat pump.

BACKGROUND

Metals or alloys react with hydrogen exothermically to produce metal hydrides, and the metal hydrides reversibly release hydrogen gas endothermically. $LaNi_5H_x$, $MmNi_5H_x$, $MmCo_5H_x$, $FeTiH_x$, $VNbH_x$ and $Mg_2CuH$ are common examples of metal hydrides which have the ability to occlude a significant amount of hydrogen and release a large amount of the heat of reaction. Various metal hydride devices are known, such as heat pumps and air conditioning devices, which utilize these properties of the metal hydrides to provide heating and/or refrigeration. In these metal hydride devices, hydrogen is used as a refrigerant and metal hydrides are used as absorbents.

A conventional metal hydride heat pump comprises a first receptacle filled with a first metal hydride, a second receptacle filled with a second metal hydride, the first and the second metal hydrides having different equilibrium dissociation characteristics; a hydrogen flow pipe connecting these receptacles; and heat exchangers in the respective receptacles. Typically, a heating output and a cooling output, based on the heat generation and absorption of the metal hydrides within the receptacle, is obtained by means of a medium flowing within the heat exchangers.

The metal hydride heat pump operates in a cyclic nature. A pair of two different types of metal hydrides are used, viz., regenerating alloy A and refrigerating alloy B, as sorbents, and hydrogen as a refrigerant. In the first cycle of operation of paired reactors of alloys A & B, alloy A discharges hydrogen using a first medium of high temperature heat source. The discharged hydrogen is absorbed by the alloy B and in the process heat is rejected to a second medium, typically ambient air. In the second cycle alloy B desorbs hydrogen using a third stream of low temperature heat source. The discharged hydrogen is absorbed by alloy A and in the process heat is rejected to the fourth stream, typically ambient air. Thus, the operation of the metal hydride heat pump requires each alloy to go through a temperature swing for charging and discharging.

Conventionally, dampers are used for the changeover. The dampers, ducting and the casing of the heat pump form a part of the thermal cycling, which results in increased thermal inertia. U.S. Pat. No. 6,722,154 suggests a metal hydride based air cooling method and apparatus. The apparatus comprises an intricate network of air conduits and dampers. This results in an increased thermal inertia. Higher thermal inertia is highly undesirable for the system and results in reduced performance. The arrangement of reactor casings connected with multiple dampers by interconnecting ducting requires multiple bends and higher flow length for the air streams used as the heat transfer medium. This results in higher pressure drop in the system, requiring higher power for the air fans and blowers. Furthermore, the air distribution is not uniform resulting in reduced performance. The multiple dampers are connected to the reactor casing by interconnecting ducting which makes the system bulky and heavy. Also, the interconnecting ducting results in increased height of the system, which is undesirable for applications such as mobile air conditioning in vehicles, due to the increased drag force on the vehicle.

There is therefore need for an air changeover system for metal hydride heat pumps that overcomes the above-noted drawbacks of conventional air changeover systems in metal hydride heat pumps.

OBJECTS

Some of the objects of the system of the present disclosure, which at least one embodiment herein satisfies, are as follows:

It is an object of the present disclosure to provide an improved air changeover system for metal hydride heat pumps.

It is another object of the present disclosure to provide an air changeover system for metal hydride heat pumps which reduces the thermal inertia and enhances the performance.

It is yet another object of the present disclosure to provide an air changeover system for metal hydride heat pumps which reduces pressure drop in the heat transfer medium while flowing through the heat pump, thereby reducing the power consumption in running fans and blowers.

One more object of the present disclosure is to provide an air changeover system for metal hydride heat pumps which gives uniform air distribution in the reactor.

It is still another object of the present disclosure to provide an air changeover system for metal hydride heat pumps which is compact, has a reduced weight, and a reduced height which decreases the drag forces on the vehicle.

Other objects and advantages of the present disclosure will be more apparent from the following description when read in conjunction with the accompanying figures, which are not intended to limit the scope of the present disclosure.

SUMMARY

In accordance with an embodiment of the present disclosure, there is provided an air changeover system for metal hydride heat pump, said system comprising:

- a first metal hydride reactor module and a second metal hydride reactor module, said metal hydride reactor modules being aligned and separated by a partition;
- a shell for containing said metal hydride reactor modules, said shell is compartmentalized to define a separate insulated chamber for each of said metal hydride reactor modules, each of said chambers having an inlet and an outlet for heat transfer medium; and
- a bearing assembly for supporting said metal hydride reactor modules at a location about said partition, said bearing assembly comprising a drive mechanism for rotating said metal hydride reactor modules about an axis.

Typically, the changeover between an absorption mode and a desorption mode is achieved by rotating said first and said second metal hydride reactor modules by 180°.

The chambers in said shell are separated by partitioning means including one or more flexible seals and one or more non-flexible seals. Additionally, one or more air seal is provided on the inner side of said shell to prevent short circuiting of said heat transfer medium between said inlet and said outlet.

The heat transfer medium may be air, and each of said chambers in said shell may receive a different stream of said air.

The first metal hydride reactor module and said second metal hydride reactor module comprise a refrigerating alloy or a regenerating alloy, depending on their role in the heat pump.

Additionally, in accordance with another embodiment of the present disclosure, there is provided an air changeover system for metal hydride heat pump, said system comprising:

- a first pair of metal hydride reactor modules and a second pair of metal hydride reactor modules, said first pair of metal hydride reactor modules and said second pair of metal hydride reactor modules being aligned and separated by partitions;
- a shell for containing said first pair of metal hydride reactor modules and said second pair of metal hydride reactor modules, said shell is compartmentalized to define a separate insulated chamber for each of said metal hydride reactor modules, each of said chambers having an inlet and an outlet for heat transfer medium; and
- a bearing assembly for supporting said metal hydride reactor modules centrally about said partitions, said bearing assembly comprising a drive mechanism for rotating said metal hydride reactor modules about an axis.

Typically, the changeover between an absorption mode and a desorption mode is achieved by rotating said first pair of metal hydride reactor modules and said second pair of metal hydride reactor modules by 90°.

The chambers in said shell are separated by partitioning means including one or more flexible seals and one or more non-flexible seals. Additionally, one or more air seal is provided on the inner side of said shell to prevent short circuiting of said heat transfer medium between said inlet and said outlet.

The heat transfer medium may be air, and each of said chambers in said shell may receive a different stream of said air.

The first pair of metal hydride reactor modules comprise one or more regenerating alloy and the second pair of metal hydride reactor modules comprise one or more refrigerating alloy.

BRIEF DESCRIPTION OF THE ACCOMPANYING DRAWING

The system of the present disclosure will now be described with the help of the accompanying drawing, in which.

DETAILED DESCRIPTION

A system and a method of the present disclosure will now be described with reference to the embodiments which do not limit the scope and ambit of the disclosure.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
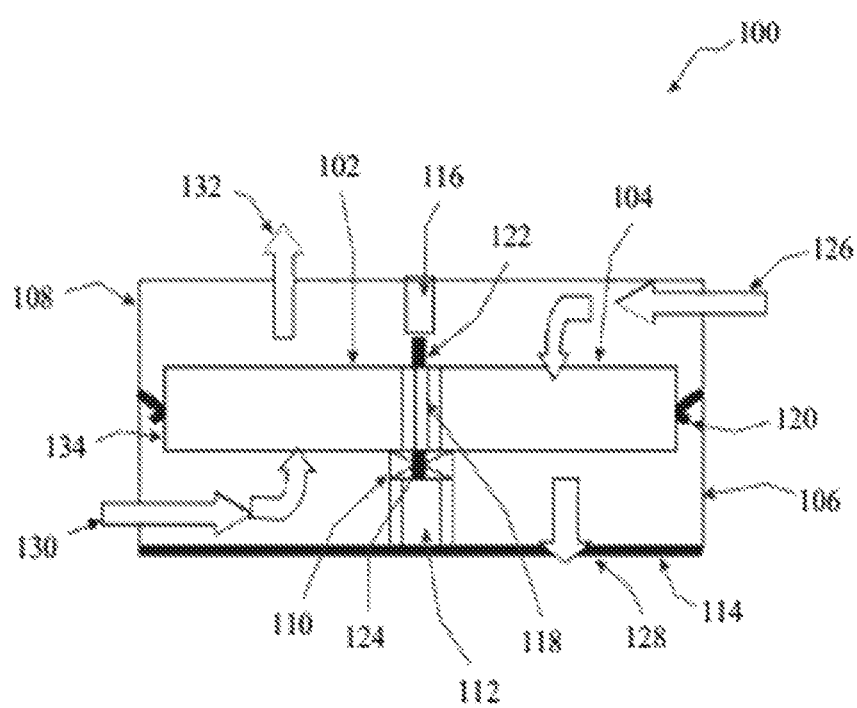
FIG. 1 illustrates a schematic of a preferred embodiment of the air changeover system for metal hydride heat pump.
Figure 2:
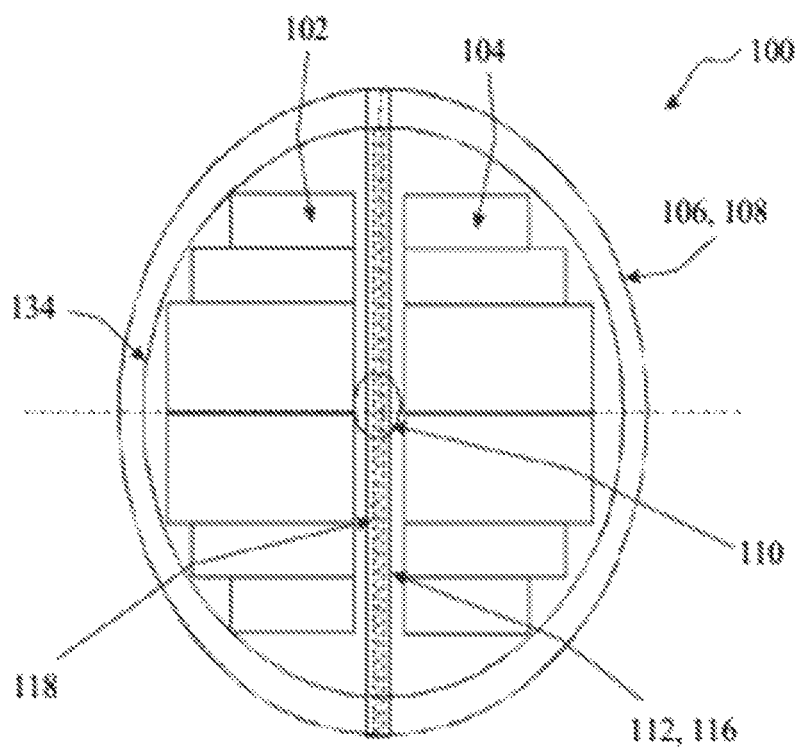
FIG. 2 illustrates a top view of the preferred embodiment shown in FIG. 1.

FIGS. 1 & 2 of the accompanying drawings illustrate a schematic of a preferred embodiment of the air changeover system of the present disclosure, the preferred embodiment is generally referenced by the numeral 100 in the FIGS. 1 & 2. The air changeover system of the present disclosure has disc-type reactor modules which can be rotated between the absorption mode and the desorption mode. Thus, only the reactor module with the support structure is rotated for the changeover of the streams of the heat transfer medium. The arrangement results in reduced thermal inertia, as the reactor casing remains stationary during the operation cycle and after the changeover it experiences the same heat transfer medium stream, since the casing does not contribute to the temperature cycling, the thermal inertia of the system is reduced, resulting in higher performance; also, the system has no or very little ducting which reduces the ducting thermal inertia, thereby improving the system performance.

Further, the arrangement of the present disclosure has fewer bends and a reduced flow length for the heat transfer medium, which decreases the pressure drop in the medium across the system. The decreased pressure drop reduces the energy consumption at running air fans and blowers. The arrangement provides uniform air distribution over the reactor modules as dampers and ducting are absent. The absence of dampers and ducting also reduces the size, weight and height of the metal hydride heat pump, and assists in reducing the drag forces on the vehicle in dynamic applications. The system uses one or more sets of paired refrigerating and regenerating alloy metal hydride reactor modules to give continuous cooling as each pair provides an output only during half cycle. The paired reactors are arranged so as to make the system compact.

FIGS. 1 & 2 show a side view and a top view of the system 100, respectively. The system 100 comprises a first metal hydride reactor module 102 and a second metal hydride reactor module 104. The first metal hydride reactor module 102 and the second metal hydride reactor module 104 are aligned with each other and mounted on a support structure 134 containing a partition 118 for separating the two modules 102 & 104. The first metal hydride reactor module 102 and the second metal hydride reactor module 104 receive two different streams of the heat transfer medium, preferably air, at inlets 130 & 126, respectively, for a cyclic operation. The flow path of the air streams through the reactor modules is illustrated in the FIG. 1 by arrows. The air streams pass through the reactor modules 102 & 104 and are discharged through the outlets 132 & 128, respectively.

The reactor modules 102 & 104 are positioned within a shell. The system 100 comprises a top shell 108 and a bottom shell 106. The shells 106 & 108 are compartmentalized to define separate insulated chambers for the reactor modules 102 & 104. The chambers include the inlets 130 & 126 and the outlets 132 & 128 for providing flow passage to the air streams. The chambers are separated by partitioning means. The partitioning means includes flexible seals 122 & 124 and non-flexible seals 112 & 116. One or more air seals 120 are provided on the inner side of the bottom shell 106 & the top shell 108 to prevent short circuiting of the air streams in the chambers between the inlets 130 & 126 and the outlets 132 & 128. The chambers are thermally isolated from each other. Additionally, thermal insulation may also be provided in the partitioning means.

The metal hydride reactor modules 102 & 104 are mounted on a bearing assembly 110 about the partition 118. The bearing assembly 110 comprises a drive mechanism (not shown in the figure) for smoothly rotating the reactor modules 102 & 104 about an axis for changeover of the cycle. The bearing assembly 110 with the drive mechanism is installed on a base frame 114.

The bottom shell 106 and the top shell 108 assist in guiding the air streams in the chambers. In a preferred embodiment, the non-flexible seals 112 & 116 are provided at the bottom shell 106 and the top shell 108 to avoid mixing of the two air streams in the chambers. The flexible seals 124 & 122 are provided on the non-flexible seals 112 & 116 to avoid mixing of the air streams during operation in stationary condition as well as rotating condition. The air seals 120 are provided to prevent short circuiting in the reactor module chambers, so that the air streams pass through the reactor modules.

Ambient air is received through inlet 130 and cold air or return air is received at inlet 126. The ambient air is discharged through outlet 132 and the return air is discharged through outlet 128. The air flow directions of the streams is shown opposite, however the streams can also be passed in parallel.

Figure 3:
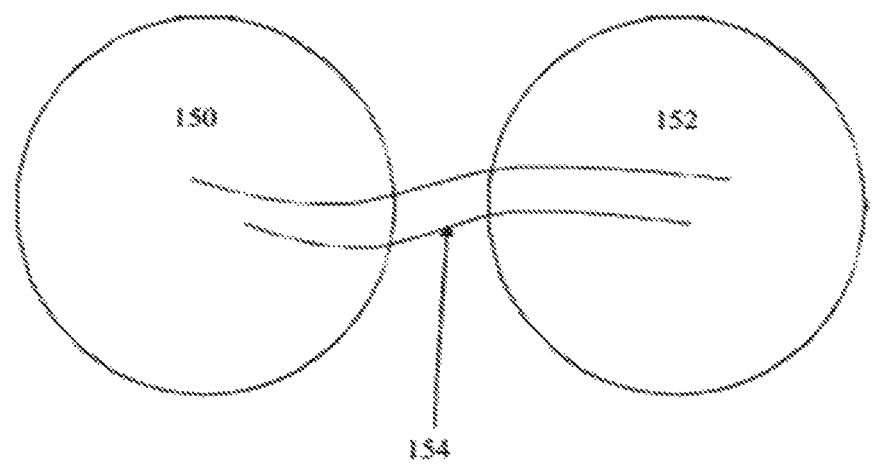
FIG. 3 illustrates an arrangement of the metal hydride heat pump using the air changeover system of FIGS. 1 & 2.

In the system 100, both the reactor modules 102 & 104 contain a refrigerating alloy. The reactor modules containing a regenerating alloy may also be obtained similarly. FIG. 3 shows an arrangement of the metal hydride heat pump using the system 100. An air changeover system with refrigerating alloy 150 is connected to an air changeover system with regenerating alloy 152 by a flexible hydrogen tubing 154 to form the metal hydride heat pump.

Figure 4:
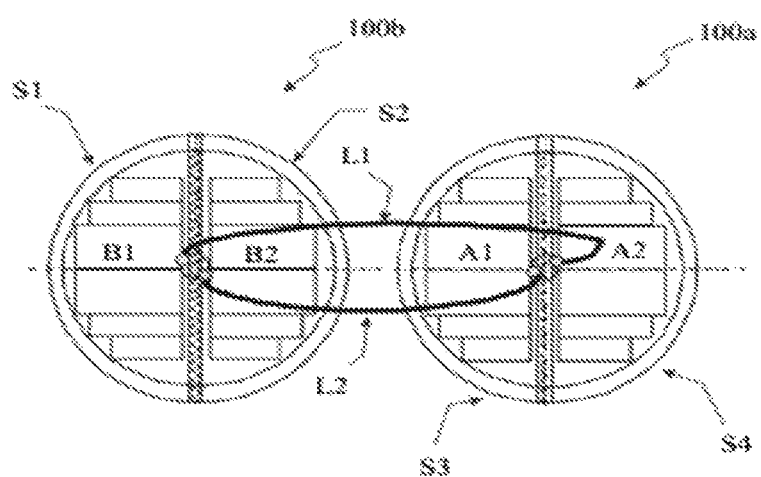
FIG. 4 illustrates the position of the air changeover system in the arrangement shown in FIG. 3 during a first half cycle.
Figure 5:
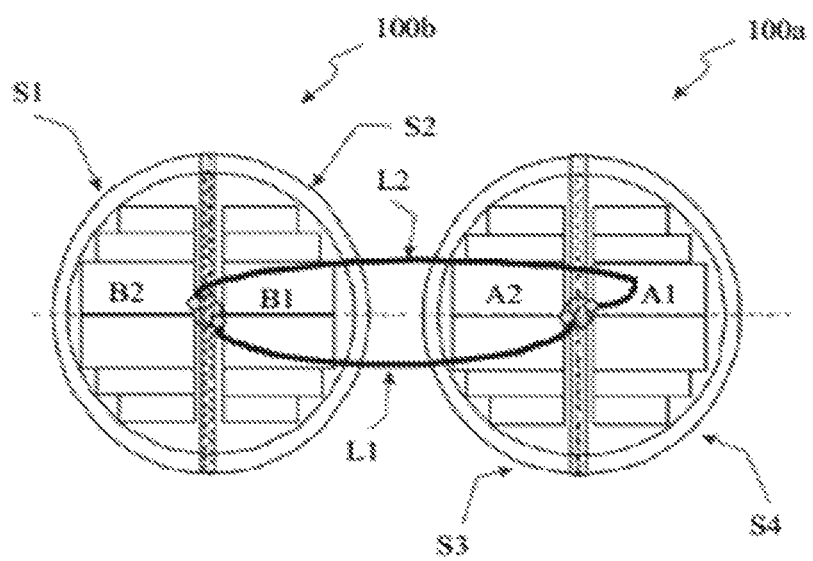
FIG. 5 illustrates the position of the air changeover system in the arrangement shown in FIG. 3 during a second half cycle.

The arrangement of air changeover systems 100a and 100b is illustrated in the FIGS. 4 & 5. The metal hydride heat pump comprises the air changeover system 100a containing the regenerating alloy and the air changeover system 100b containing the refrigerating alloy. The two air changeover systems 100a & 100b are connected by means of hydrogen Line 1 (L1) and Line 2 (L2). The air changeover system 100a comprises two reactor modules A1 and A2 containing the regenerating alloy. The system 100a receives an air stream 3 (S3) of ambient air for rejecting heat or acting as a heat sink, and an air stream 4 (S4) of hot air or high temperature air acting as a heat source to the system 100a. The air changeover system 100b comprises two reactor modules B1 and B2 containing the refrigerating alloy. The system 100b receives an air stream 1 (S1) of cold air/return air which is to be cooled and acts as a low temperature heat source in the system 100b and an air stream 2 (S2) of ambient air for rejecting heat or acting as a heat sink. The reactor module A1 of the system 100a is connected to the reactor module B1 of the system 100b by means of flexible tubing Line 1 (L1). The reactor module A2 of the system 100a is connected to the reactor module B2 of the system 100b by means of flexible tubing Line 2 (L2).

During a first half cycle, the reactor module B1 receives the air stream 1 (S1) of cold air/heat source and the reactor module B2 receives the air stream 2 (S2) of ambient air/heat sink. This first half cycle is referred to as the Position A. In a second half cycle, the reactor module B2 receives the air stream 1 (S1) of cold air/heat source and the reactor module B1 receives the air stream 2 (S2) of ambient air/heat sink. This second half cycle is referred to as the Position B. Similarly, in Position A the reactor module A1 receives the air stream 3 (S3) of ambient air/heat sink and the reactor module A2 receives the air stream 4 (S4) of hot air/high temperature heat source. In the Position B, the reactor module A1 receives the air stream 4 (S4) of hot air/high temperature heat source, and the reactor module A2 receives the air stream 3 (S3) of ambient air/heat sink. For the changeover from the Position A to the Position B, the reactor modules are rotated by 180°. The rotating time is typically a few seconds. A smaller rotating time is preferred. The Position B is maintained for the second half cycle, which is typically of one to six minutes. This completes the process cycle. Once the process cycle is complete the reactor modules are again rotated to the Position A for the first half cycle.

Table 1 shows an example of the time distribution of the reactor positions for a complete operation cycle and the rotating time in a preferred embodiment. The time duration for a typical complete cycle is about 360 seconds, as depicted in Table 1. It is preferred to have changeover rotation in the opposite direction during every half cycle time changeover. However, the reactor modules may also be rotated in the same direction during the changeover.

TABLE 1

| Position A time duration | Rotation time | Position B time duration | Rotation time | Total cycle time |
|---|---|---|---|---|
| 175 sec. | 5 sec | 175 sec. | 5 sec. | 360 sec. |

The systems 100a & 100b operate alternatively at the Position A and the Position B. FIG. 4 illustrates the Position A, and FIG. 5 illustrates the Position B.

In the Position A:

The reactor module A1 operates in absorption mode at low pressure to reject heat to the air stream 3 (S3), the reactor module B1 operates in desorption mode at low pressure for cooling the air stream 1 (S1), the reactor module A2 operates in desorption mode at high pressure to take heat from the air stream 4 (S4), and the reactor module B2 operates in absorption mode at high pressure to reject heat to the air stream 2 (S2). The air stream 1 (S1) enters the system 100b and passes over the reactor module B1 which is connected to the reactor module A1 by Line 1 (L1). The air stream 3 (S3) passes over the reactor module A1. During this process the hydrogen desorbed in the reactor module B1 is absorbed in the reactor module A1. During the desorption process, the air stream 1 (S1) in the reactor module B1 is further cooled. Heat is released in the reactor module A1 during the absorption of the hydrogen, this heat is rejected to the air stream 3 (S3). The air stream 4 (S4) passes over the reactor module A2, this hot air stream acts as high temperature heat source for the reactor module A2 and increases the pressure and desorbs the hydrogen. The reactor modules A2 and B2 are connected by Line 2 (L2). The hydrogen desorbed in the reactor module A2 is absorbed in the reactor module B2. The heat released during the absorption process is rejected to the air stream 2 (S2).

In the Position B:

The reactor module A2 operates in absorption mode at low pressure to reject heat to the air stream 3 (S3), the reactor module B2 operates in desorption mode at low pressure for cooling the air stream 1 (S1), the reactor module A1 operates in desorption mode at high pressure to take heat from the air stream 4 (S4), and the reactor module B1 operates in absorption mode at high pressure to reject heat to the air stream 2 (S2). The air stream 1 (S1) enters the system 100b to pass over the reactor module B2. The reactor module B2 is connected to the reactor module A2 via Line 2 (L2). The air stream 3 (S3) is passed over the reactor module A2. During the process, the hydrogen desorbed in the reactor module B2 is absorbed in the reactor module A2. During the desorption process, the air stream 1 (S1) in the reactor module B2 is further cooled. Heat is released in the reactor module A2 during the absorption of the hydrogen, this heat is rejected to the air stream 3 (S3). The air stream 4 (S4) passes over the reactor module A1, this hot air stream acts as high temperature heat source for the reactor module A1 and increases the pressure and desorbs the hydrogen. The reactor modules A1 and B1 are connected by Line 1 (L1). The hydrogen desorbed in the reactor module A1 is absorbed in the reactor module B1. The heat released during the absorption process is rejected to the air stream 2 (S2).

Figure 6:
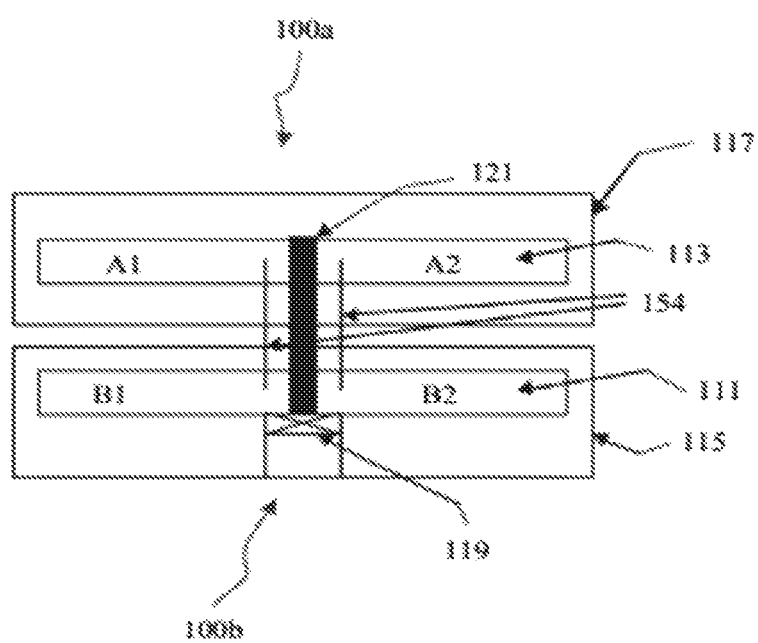
FIG. 6 illustrates an alternative arrangement of the metal hydride heat pump using the air changeover system of FIGS. 1 & 2.

FIG. 6 shows an alternative arrangement of the metal hydride heat pump using the system 100. The air changeover system 100a and the air changeover system 100b are arranged one above the other to form the metal hydride heat pump. The systems 100a & 100b are connected by the flexible hydrogen tubing 154, rotate about the same axis by means of a single bearing assembly 119, and are supported by means of a common support 121. The reactor modules 111 & 113 are placed in shells 115 & 117, respectively. The arrangement shown in FIG. 6 further reduces the foot print of the metal hydride heat pump.

Figure 9A:
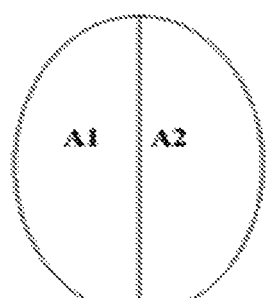
FIGS. 9 (A), 9 (B) & 9 (C) illustrate the air changeover system with two reactor assembly modules arranged in circular, square and hybrid layout, respectively.
Figure 9B:
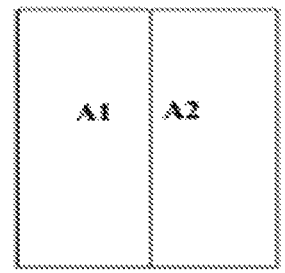
Figure 9C:
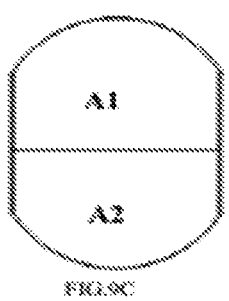

The air changeover system of the present disclosure can be arranged in a variety of layouts, including, but not limited to, circular, square, or hybrid, as shown in FIGS. 9 (A), 9 (B) and 9 (C), respectively.

Figure 7:
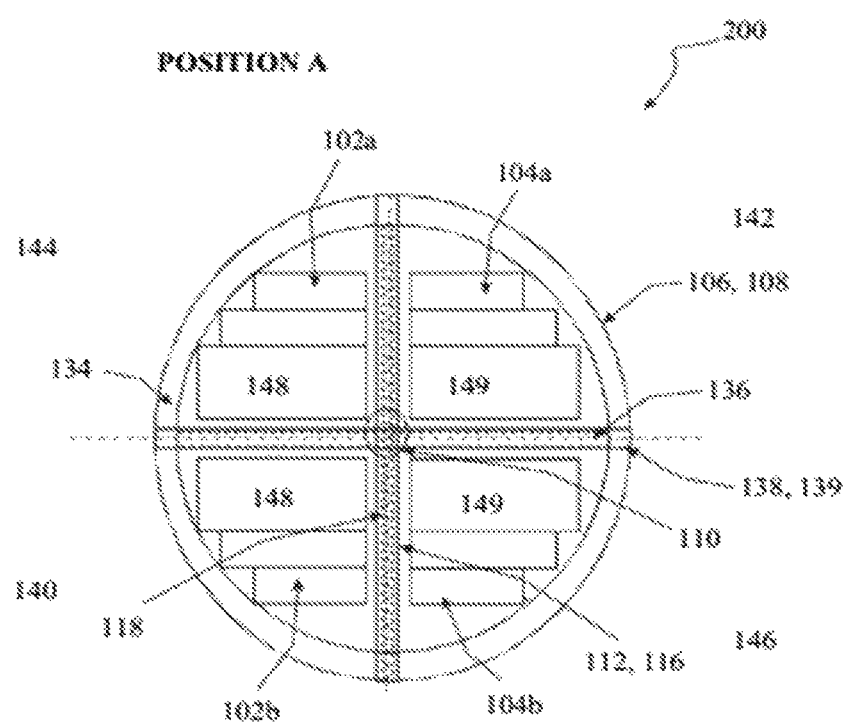
FIG. 7 illustrates the position of another preferred embodiment of the air changeover system during a first half cycle.
Figure 8:
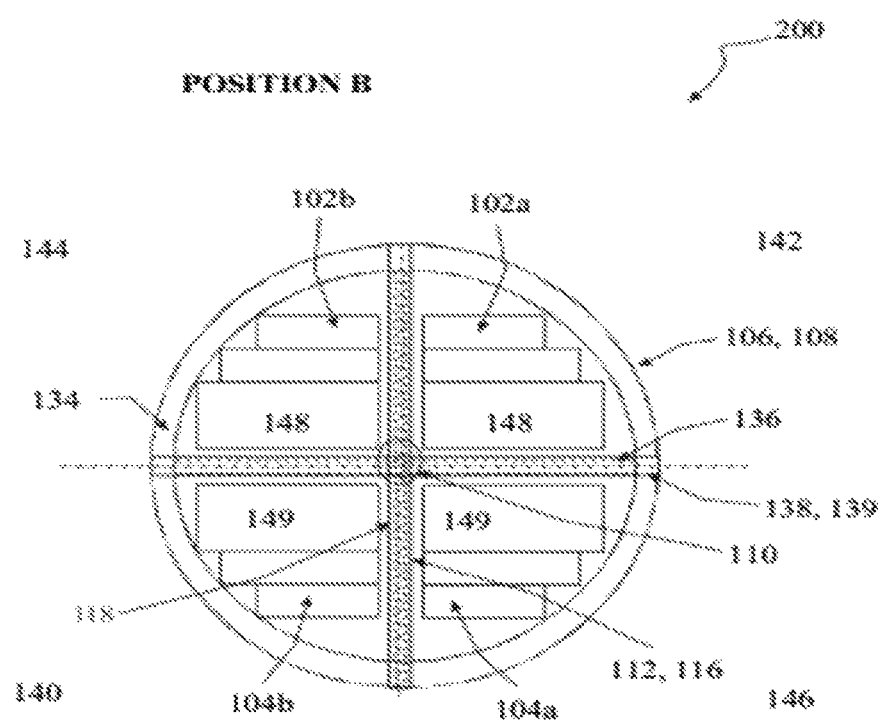
FIG. 8 illustrates the position of another preferred embodiment of the air changeover system during a second half cycle.

FIGS. 7 & 8 illustrate another preferred embodiment of the air changeover system of the present disclosure. In this embodiment four reactor modules are provided, a first pair of regenerating alloy 148 metal hydride reactor modules 102a & 102b, and a second pair of refrigerating alloy 149 metal hydride reactor modules 104a & 104b. The reactor modules are supported on the support structure 134. The system includes four chambers having four air streams 140, 142, 144 & 146. Partitions 118 and 136 are provided between the reactor modules across the diameter of the bottom shell 106 and the top shell 108. The reactor modules are positioned on the bearing assembly 110 such that the reactor modules rotate centrally about the partitions 118 and 136. Partitioning means 112 & 116 including air seals 138 & 139 are provided along the bottom shell 106 and the top shell 108 to define the four isolated chambers.

FIG. 7 shows the Position A, and FIG. 8 shows the Position B of the system of the present disclosure. In Position A, the reactor module 102a receives a hot air stream 144, the reactor module 102b receives a first ambient air stream 140, the reactor module 104a receives a second ambient air stream 142, and the reactor module 104b receives a cold air stream 146. In Position B, the reactor module 102a receives the second ambient air stream 142, the reactor module 104a receives the cold air stream 146, the reactor module 102b receives the hot air stream 144, and the reactor module 104b receives the first ambient air stream 140. The changeover from Position A to Position B is achieved by rotating the reactor modules by 90° in the clockwise direction. The changeover from Position B to Position A is achieved by rotating the reactor modules by 90° in the anti-clockwise direction.

Technical Advancement

The air changeover system for metal hydride heat pumps, as described in the present disclosure, has several technical advantages including, but not limited to, the realization of:

the system reduces the thermal inertia and enhances the performance;

the system reduces pressure drop in the heat transfer medium while flowing through the heat pump, thereby reducing the power consumption in running fans and blowers;

the system gives uniform air distribution in the reactor; and the system is compact, has a reduced weight, and a reduced height which decreases the drag forces on the vehicle Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. An air changeover system for a metal hydride heat pump, said system comprising:
   a first metal hydride reactor module and a second metal hydride reactor module, said metal hydride reactor modules being aligned and separated by a partition;
   a shell for containing said metal hydride reactor modules, said shell is compartmentalized to define a separate insulated chamber for each of said metal hydride reactor modules, each of said chambers having an inlet and an outlet for heat transfer medium, wherein said chambers in said shell are separated by partitioning means including one or more flexible seals and one or more non-flexible seals, wherein the shell is configured to remain stationary during at least one operation cycle of the pump; and
   a bearing assembly for supporting said metal hydride reactor modules at a location about said partition, said bearing assembly comprising a drive mechanism for rotating said metal hydride reactor modules about an axis.

2. The air changeover system as claimed in claim 1, wherein the changeover between an absorption mode and a desorption mode is achieved by rotating said first and said second metal hydride reactor modules by 180°.

3. The air changeover system as claimed in claim 1, wherein one or more air seal is provided on the inner side of said shell to prevent short circuiting of said heat transfer medium between said inlet and said outlet.

4. The air changeover system as claimed in claim 1, wherein each of said chambers in said shell receive a different stream of said heat transfer medium.

5. The air changeover system as claimed in claim 1, wherein said heat transfer medium is air.

6. The air changeover system as claimed in claim 1, wherein said first metal hydride reactor module and said second metal hydride reactor module comprise a refrigerating alloy.

7. The air changeover system as claimed in claim 1, wherein said first metal hydride reactor module and said second metal hydride reactor module comprise a regenerating alloy.

8. An air changeover system for a metal hydride heat pump, said system comprising:
   a first pair of metal hydride reactor modules and a second pair of metal hydride reactor modules, said first pair of metal hydride reactor modules and said second pair of metal hydride reactor modules being aligned and separated by partitions;
   a shell for containing said first pair of metal hydride reactor modules and said second pair of metal hydride reactor modules, said shell is compartmentalized to define a separate insulated chamber for each of said metal hydride reactor modules, each of said chambers having an inlet and an outlet for heat transfer medium, wherein said chambers in said shell are separated by partitioning means including one or more flexible seals and one or more non-flexible seals, wherein the shell is configured to remain stationary during at least one operation cycle of the pump; and
   a bearing assembly for supporting said metal hydride reactor modules centrally about said partitions, said bearing assembly comprising a drive mechanism for rotating said metal hydride reactor modules about an axis.

9. The air changeover system as claimed in claim 8, wherein the changeover between an absorption mode and a desorption mode is achieved by rotating said first pair of metal hydride reactor modules and said second pair of metal hydride reactor modules by 90°.

10. The air changeover system as claimed in claim 8, wherein one or more air seal is provided on the inner side of said shell to prevent short circuiting of said heat transfer medium between said inlet and said outlet.

11. The air changeover system as claimed in claim 8, wherein said heat transfer medium is air.

12. The air changeover system as claimed in claim 11, wherein each of said chambers in said shell receive a different stream of said air.

13. The air changeover system as claimed in claim 8, wherein said first pair of metal hydride reactor modules comprise one or more regenerating alloy and said second pair of metal hydride reactor modules comprise one or more refrigerating alloy.

* * * * *